(12) United States Patent
Lam et al.

(45) Date of Patent:

(10) Patent No.: US 9,229,446 B2
(45) Date of Patent: Jan. 5, 2016

(54) PRODUCTION LINE QUALITY PROCESSES

(75) Inventors: Mark T Lam, Singapore (SG); Ooi T Ong, Singapore (SG)

(73) Assignee: International Business Machines Corporation, Armonk, NY (US)

( * ) Notice: Subject to any disclaimer, the term of this patent is extended or adjusted under 35 U.S.C. 154(b) by 663 days.

(21) Appl. No.: 13/466,963

(22) Filed: May 8, 2012

(65) Prior Publication Data

US 2013/0304245 A1 Nov. 14, 2013

(51) Int. Cl.
*G05B 15/02* (2006.01)
*G05B 19/418* (2006.01)

(52) U.S. Cl.
CPC ...... *G05B 19/4187* (2013.01); *G05B 19/41875* (2013.01); *G05B 2219/32324* (2013.01); *G05B 2219/34355* (2013.01); *G05B 2219/45031* (2013.01)

(58) Field of Classification Search
CPC ............ G05B 19/4187; G05B 19/41875; G05B 2219/32324; G05B 2219/34355; G05B 2219/45031; G07C 3/14; G07C 3/143; G07C 3/146; G06F 11/3409; G06F 11/3428; G06F 11/3466
USPC ............. 700/95, 105, 108, 109, 110, 121; 702/81, 82, 83, 84, 182, 183, 184, 185
See application file for complete search history.

(56) References Cited

U.S. PATENT DOCUMENTS

| | | | |
|---|---|---|---|
| 6,430,456 B1 * | 8/2002 | Black et al. | 700/110 |
| 6,532,182 B2 * | 3/2003 | Ogawa et al. | 700/121 |
| 6,587,801 B2 * | 7/2003 | Funakoshi | 702/84 |
| 6,714,885 B1 | 3/2004 | Lee | |
| 6,738,681 B2 * | 5/2004 | Kobayashi | 700/121 |
| 6,816,751 B1 * | 11/2004 | Alice et al. | 700/109 |
| 6,921,974 B2 | 7/2005 | Boon et al. | |
| 6,922,656 B2 * | 7/2005 | Butler et al. | 702/183 |
| 7,123,980 B2 * | 10/2006 | Funk et al. | 700/121 |
| 7,221,987 B2 * | 5/2007 | Bett et al. | 700/108 |
| 7,221,993 B2 * | 5/2007 | Rice et al. | 700/112 |
| 7,329,551 B2 | 2/2008 | Williams et al. | |
| 7,346,409 B2 * | 3/2008 | Nakajima et al. | 700/108 |
| 7,512,508 B2 * | 3/2009 | Rajski et al. | 702/118 |
| 7,617,467 B2 | 11/2009 | Bell et al. | |

(Continued)

OTHER PUBLICATIONS

J. Agapakis, Improving yield, productivity, and quality in test assembly and packaging through direct part marking and unit level traceability, 2002, 2 pages, abstract only, http://ieeexplore.ieee.org/xpl/freeabs_all.jsp?arnumber=1032743.

(Continued)

*Primary Examiner* — Charles Kasenge (74) *Attorney, Agent, or Firm* — Lieberman & Brandsdorfer, LLC (57) ABSTRACT

Methods, systems, and software for improving the product quality of a production line having multiple production steps, at least some of which employ multiple individual tools, including producing product lots using different combinations of tools, setting a quality benchmark for the resulting product lots, identifying product lots that meet the quality benchmark, identifying the tools used to produce the identified quality product lots, and producing additional product lots using at least substantially the identified quality tools.

22 Claims, 5 Drawing Sheets

(56) References Cited

U.S. PATENT DOCUMENTS

| | | | |
|---|---|---|---|
| 7,899,567 B2* | 3/2011 | Tanaka et al. | 700/109 |
| 2002/0022937 A1* | 2/2002 | Funakoshi | 702/84 |
| 2002/0059012 A1* | 5/2002 | Ogawa et al. | 700/121 |
| 2005/0212097 A1 | 9/2005 | Shih et al. | |
| 2006/0282189 A1* | 12/2006 | Akisawa et al. | 700/110 |
| 2007/0021855 A1* | 1/2007 | Ono et al. | 700/110 |
| 2008/0278495 A1 | 11/2008 | Minamide et al. | |
| 2010/0049355 A1* | 2/2010 | Chu et al. | 700/110 |
| 2011/0089465 A1 | 4/2011 | Lin et al. | |
| 2011/0291683 A1 | 12/2011 | Mueller | |

OTHER PUBLICATIONS

Randy Bordeos, The practical and cost saving approach of ESD control solution in manufacturing, Oct. 6-10, 2002, 2 pages, abstract only, http://ieeexplore.ieee.org/xpl/freeabs_all.jsp?arnumber=5267007.

S. H. Voldman, Electrostatic discharge (ESD) testing of semiconductor chips and systems—paradigm shifts, and semiconductor industry consequences, Nov. 1-4, 2010, 2 pages, abstract only, http://ieeexplore.ieee.org/xpl/freeabs_all.jsp?arnumber=5667853.

* cited by examiner

PRODUCTION LINE QUALITY PROCESSES

BACKGROUND

The present invention relates to production line processes, and more particularly to improving lot quality for product lots produced on a production line having a plurality of production steps, where at least some of the production steps utilize a plurality of individual tools.

A production line typically refers to a set of sequential manufacturing operations, where each step in the sequence brings the raw material submitted to the production line closer to the form of the desired manufactured product. The product of a given production line may be the final desired product, or the production line may produce an intermediate material that requires additional manufacturing steps, perhaps by traversing one or more additional production lines, in order to obtain the desired overall final product.

It is not unusual for a given production line to include multiple production steps, and some or all of these production steps may in turn employ multiple individual tools or workstations, where each tool is capable of carrying out the desired fabrication for that production step. In such cases each individual product lot may take very different routes through the production line overall, as each tool in a production step that includes multiple tools represents a branch in the flow of product.

While this kind of multiplicity may enhance overall throughput, it presents particular challenges when product lots begin exhibiting flaws or defects. The time and effort required to troubleshoot the entire production line and identify the particular tools and workstations that are generating the defects represents a substantial loss in valuable production time.

BRIEF SUMMARY

The present disclosure is directed to methods, systems, and computer programs for improving product lot quality for product lots produced by a production line, so that both the quality of the product and the overall throughput of the production line are maintained.

According to one embodiment of the present invention, for a production line having multiple production steps, at least some of which employ multiple individual tools, product lot quality may be improved by a method that includes producing product lots using different combinations of tools, determining quality values for the produced product lots, setting a quality benchmark for the resulting product lots, identifying product lots that meet the quality benchmark, identifying the tools used to produce the identified quality product lots, and producing additional product lots by shifting production at least substantially to the set of identified quality tools.

According to another embodiment of the present invention, for a production line having multiple production steps, at least some of which employ multiple individual tools, product lot quality may be improved by a method that includes producing product lots using different combinations of tools, determining a quality value for the produced product lots; setting a quality benchmark for the product lots, identifying product lots that fail to meet the quality benchmark, identifying the tools used to produce the failing product lots, identifying the tools used to produce the identified quality product lots, and producing additional product lots by shifting production at least substantially to those tools that are not identified failing tools, excepting those tools that are identified as failing tools and simultaneously identified as quality tools.

According to yet another embodiment of the present invention, a production system may include a production line having multiple production steps where at least some of the production steps employ multiple individual tools. The production system may further include a processor configured to direct product lots to individual tools for each production step and to record each tool utilized to produce each product lot, a memory storage device coupled to the processor, a quality feedback input that transmits a quality value for each completed product lot to the processor, and a program including instructions stored in the memory storage device and executable by the processor to receive data identifying the individual tools used to produce each of multiple product lots; identify completed product lots that have a passing quality value, identify the tools used in the production of the identified quality product lots, and direct the routing of subsequent product lots to individual tools at each production step that have been identified as quality tools.

According to yet another embodiment of the present invention, a computer program for improving lot quality for product lots produced on a production line having multiple production steps, at least some of which employ a plurality of individual tools, may include multiple computer-executable instructions stored on a computer-readable medium, where the instructions may be executed by a server to receive data identifying the individual tools used to produce each product lot in a plurality of identified product lots, receive data identifying the quality value of each identified product lot, compare the quality of each identified product lot to a threshold quality value, identify all tools that were used to produce identified product lots that exceed the threshold quality value, and direct the production of additional product lots to those tools identified as producing product lots that exceeded the threshold quality value.

DETAILED DESCRIPTION

Figure 1:
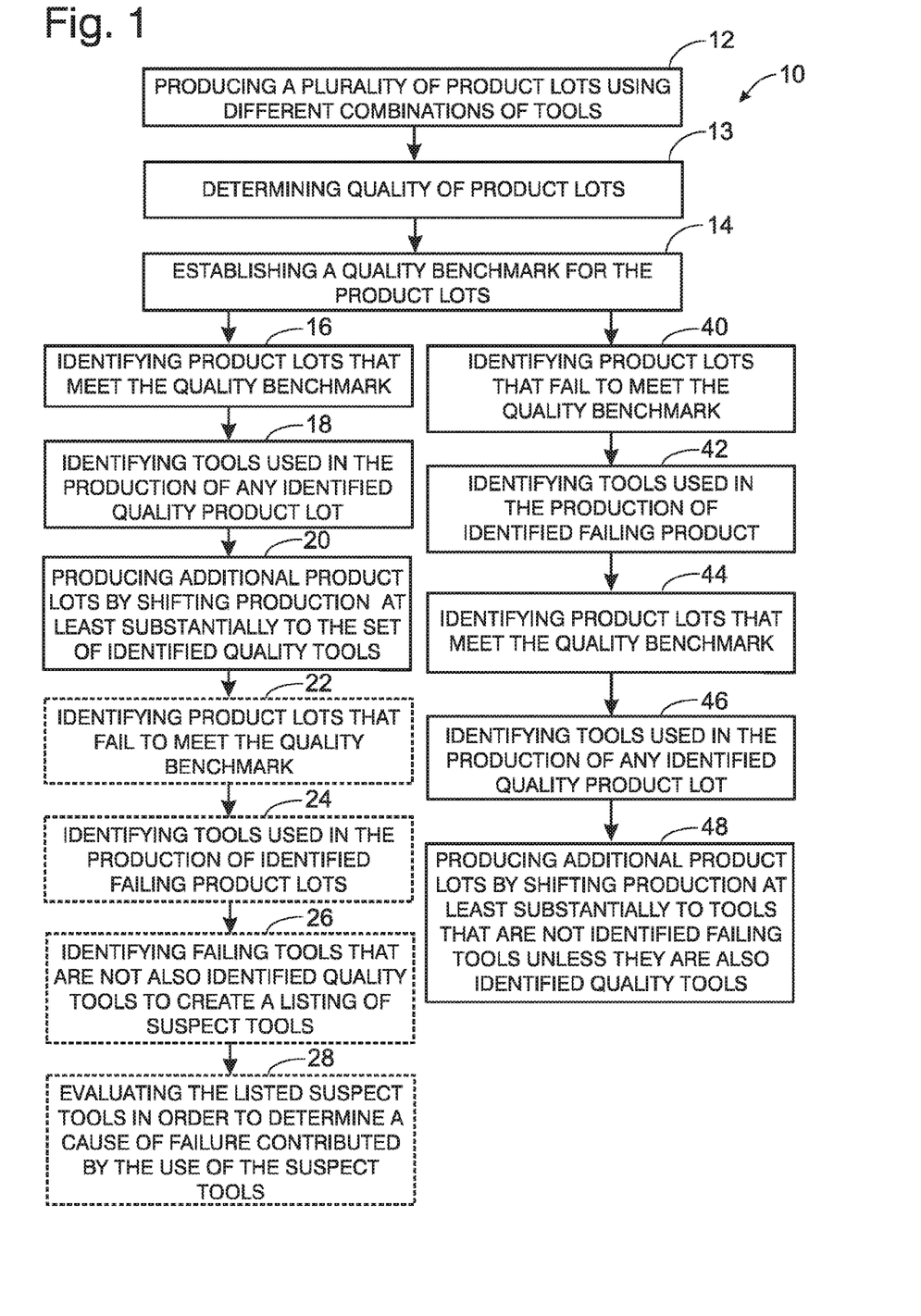
FIG. 1 is a flowchart depicting a method of improving lot quality for a production line according to an exemplary embodiment of the present invention.

With reference now to flowchart 10 of FIG. 1, one embodiment of the present invention may include a method of improving product lot quality including at least a) producing a plurality of product lots using different combinations of tools at 12; b) determining quality values for the produced production lots at 13; c) establishing a quality benchmark for the product lots at 14; d) identifying those product lots that meet the established quality benchmark at 16; e) identifying the tools used in the production of any of the identified quality products at 18; and f) producing additional product lots by shifting production at least substantially to the set of identified quality tools at 20.

By executing actions 12-20 of flowchart 10, the reduced quality of some of the products being produced by the production line may be addressed. By correlating product lots that exhibit adequate quality characteristics with the tools that were used to manufacture those quality product lots, production may be shifted to the quality tools in order to improve overall product quality, even when the specific cause or causes of an observed decrease in quality may be unknown. Advantageously, the corrective shift to quality tools may be implemented without decreasing the production line throughput, or failing to meet established production quotas. In one embodiment of the invention, the shift to quality tools, with concomitant increase in product quality, is achieved without halting the operation of the production line. That is, the manufacturing process may continue as an ongoing process while permitted pathways through the production line are adjusted to shift production to quality tools.

The method described by actions 12-20 may be extended through the further performance of actions 22-28 of flowchart 10. These additional actions include g) identifying product lots that failed to meet the established quality benchmark at 22; h) identifying the tools used in the production of the identified failing product lots at 24; identifying those failing tools that were not identified as quality tools in action e), creating a list of tools suspected of being a source of decreased quality at 26; and i) evaluating the listed suspect tools in order to determine one or more sources of decreased quality, and therefore a failure to meet the quality benchmark, that may have been caused by one or more suspect tools, at 28.

After actions 12-20, which shift production to identified quality tools, for example when a decrease in product lot quality is observed, it may often prove useful to try to determine the factors that may have contributed to the observed decrease in quality. Simply identifying all tools used to produce failing product lots, as done at 24 of flowchart 10, may not be sufficient because some production lines include production steps that employ only a single workstation for all product lots manufactured. That is, every product lot, whether it passes or fails the established quality benchmark, would have been routed through the singular workstation, creating a workflow bottleneck of sorts. It may therefore be necessary to first identify those tools used to create failing product lots, but then to additionally remove from that set of identified tools any of the tools that were also identified as producing quality product lots. This may prove helpful when troubleshooting potential reasons for the observed decrease in quality, by narrowing down potential sources of failure to a smaller subset of tools.

Figure 2A:
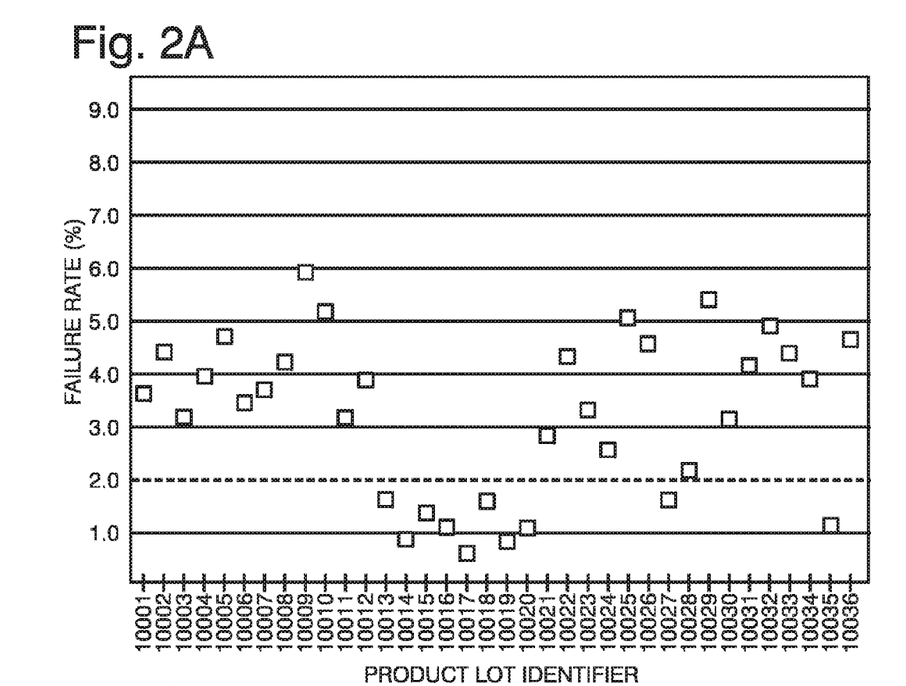
FIG. 2A represents the determination of a rate of failure within a given product lot.
Figure 2B:
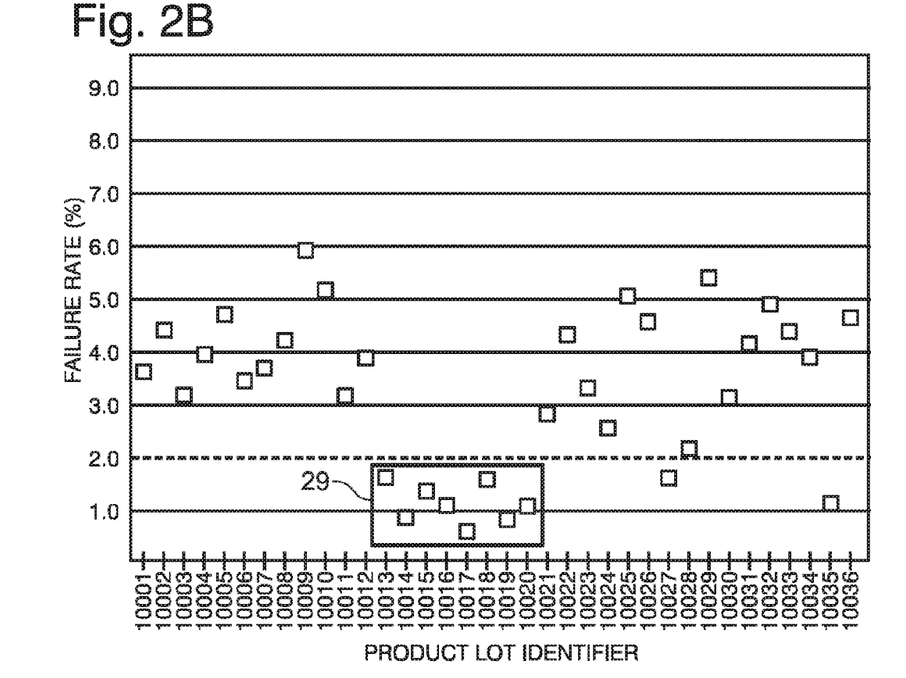
FIG. 2B depicts the selection of a set of product lots that have passed an established quality benchmark.

FIGS. 2A-2B help illustrate the application of a quality value to multiple product lots, as well as the identification of quality product lots meeting a quality benchmark, according to an exemplary embodiment of the invention. In particular, FIG. 2A depicts a plot of the failure rates for each product lot in a selection of multiple product lots. It should be appreciated that the definition of a failure for the individual products may be independent of the quality value for the overall product lot. For example, as reflected in FIG. 2A, a product failure may represent the failure of an operational test that may be performed on each product.

FIG. 2B depicts the selection of a number of a subset of product lots exhibiting failure rates below an established quality benchmark. The quality benchmark for the product lot may correspond to a maximum permitted percentage of individual failing products within the product lot as a whole. As depicted in FIG. 2B, a quality benchmark corresponding to a product failure rate of 2% has been set, as indicated by the corresponding dashed line. In this example, a quality benchmark is selected as a value included in the range of quality values determined for the product lots, i.e. about 0.5%-6.0%. Specifically, product lots 10013-10020 are shown to exhibit a failure rate of less than 2%. In the illustrative example of FIG. 2B, product lots 10013-10020 are selected to correspond to identified quality product lots, as evidenced by rectangle 29 which highlights the low failure rates for that grouping of product lots.

It should be noted that in some examples the set of identified quality product lots need not be grouped adjacent to one another, as shown in FIG. 2B. For example, product lot identifiers may have only arbitrary significance, and therefore adjacent product lots may not reflect production on the same or adjacent workstations. In an alternative aspect of the invention, the identification of quality product lots is based on passing the established benchmark, and every product lot which passes the benchmark is therefore included in the set of identified quality product lots. In reference to FIG. 2B, that methodology would also result in the inclusion of product lots 10027 and 10035 with product lots 10013-10020 as identified quality product lots.

Alternatively, or in addition, the identified set of quality product lots may be in part selected by virtue of being produced within a selected time frame, or for example by including only those product lots in the set of identified quality product lots that both a) pass the quality benchmark, and b) share a selected degree of overlap in the particular tools used during their manufacture. These methods, among others, may be used to define what is and what is not included in the set of quality product lots.

Figure 3A:
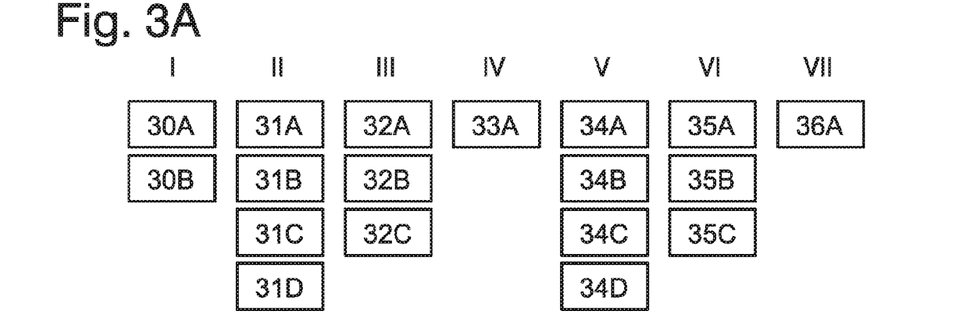
FIG. 3A is a schematic depiction of the individual tools utilized at each of the multiple steps of a production line, according to an exemplary embodiment of the invention.

FIG. 3A schematically depicts a production line that includes production steps I-VII. For each production step, the individual tools available for carrying out that step are indicated by boxes 30A-36A. That is, production step I employs two individual tools, 30A IV and VII each employ only a single individual tool, 33A and 36A respectively. For the purposes of the presently illustrated example, the selection of a particular individual tool for a given production step is random for a given product lot. It should be appreciated, however, that actual production lines may employ alternative selection schemes, which may reflect the effect of physical proximity between sequential tools, or incorporate safeguards to minimize the overuse of any particular individual tool to avoid excessive and unbalanced wear. The method of selecting the tool used for an individual product lot at any given production step may therefore be biased in one way or another. Such biases may typically be taken into consideration by careful tailoring of the selection criteria used to identify the set of quality product lots.

Figure 3B:
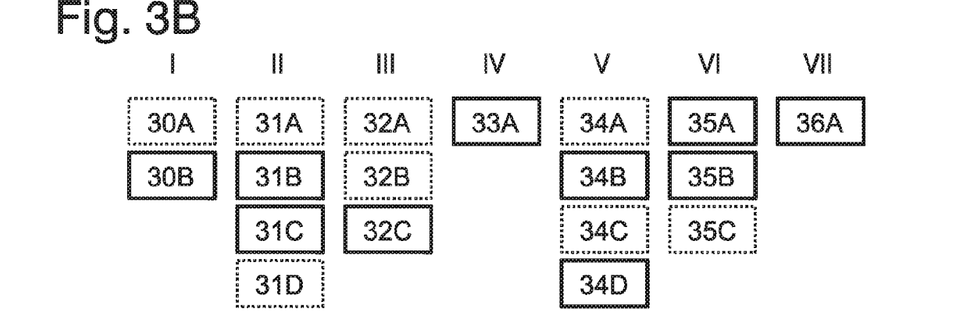
FIG. 3B depicts the identification of the tools identified as producing product lots that exceed the established quality benchmark.

FIG. 3B illustrates an exemplary identification of the tools used to prepare identified quality product lots, once the identification of quality product lots has been performed (see FIG. 2B, for example). Tools determined to have been used to prepare a quality product lot (tools 30B, 31B, 31C, 32C, 33A, 34B, 34D, 35A, 35B, and 36A) are shown as bold boxes, while the remaining tools of the production line are shown in dashed outline.

As set out at action 20 of FIG. 1, by producing additional product lots using at least substantially the set of identified quality tools, the quality of subsequent product lots should be improved. Importantly, a user need not know why the tools that produced the quality product lots identified in FIG. 2B are quality tools, or what the causes of reduced quality when using other tools might be. The user need only identify these quality tools and switch production to the identified tools in order to obtain the corresponding benefit of enhanced product quality.

However as set out at 22 of FIG. 1, it may also be desirable to identify those tools that have been used in the production of identified failing product lots. The criteria for identifying such product lots may vary. For example, with reference to FIG. 2B, failing product lots may correspond to all product lots other than lots 10013-10020. Alternatively, all product lots exhibiting a failure rate greater than that selected for the quality benchmark (in this case 2.0%) may be identified as failing product lots. In yet another aspect of the invention, another even lower quality benchmark value may be set in order to identify failing product lots. For example, with reference to FIG. 2B, by setting the failure benchmark at 5.0%, product lots 10009, 10010, 10025, and 10029 would be identified as failing product lots.

Figure 3C:
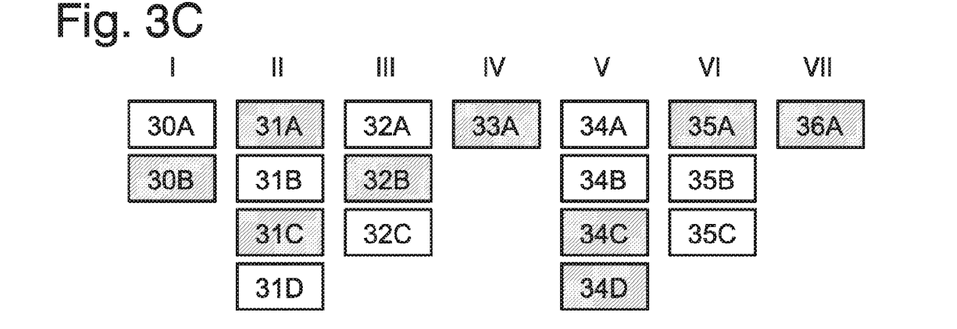
FIG. 3C depicts the identification of tools identified as failing to produce product lots that exceed the established quality benchmark.

Once the set of failing product lots has been identified, the corresponding individual tools used to produce the failing product lots are identified, as set out at 24 in FIG. 1. With reference to FIG. 3C, those tools used to produce identified failing product lots are shown with cross-hatching (tools 30B, 31A, 31C, 32B, 33A, 34C, 34D, 35A, and 36A). However, as discussed previously production steps IV and VII each employ a single tool. As a result, these tools are necessarily employed in the manufacture of every product lot that is manufactured using the production line, whether it exhibits high quality or low quality. It is therefore impossible to avoid the identification of tools 33A and 36A as being used to prepare failing product lots. However, if a tool that is identified as failing tool is also identified as a quality tool, it may be disregarded when identifying failing tools. If such a tool were the source of poor product quality and/or product failure, then it would be expected that all product lots produced by the production line would fail the quality benchmark.

Figure 3D:
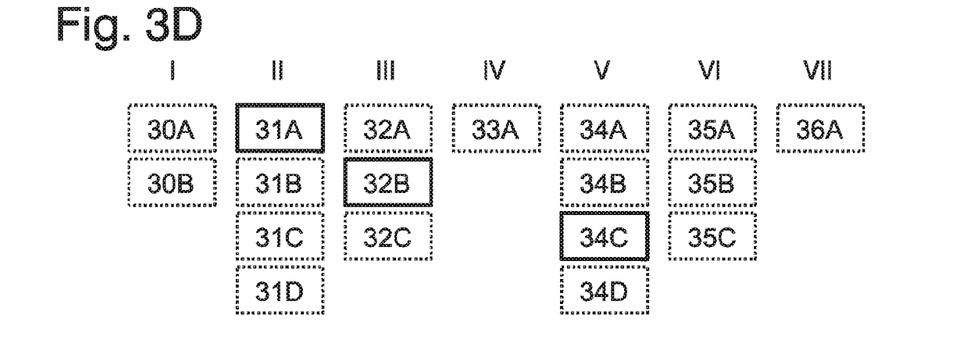
FIG. 3D depicts the identification of suspect tools for additional evaluation.

Removing those tools identified as quality tools from the set of tools identified as failing tools, as set out at 26 of FIG. 1, leaves only those tools that are likely to be a source of poor quality and/or product failure. With respect to FIG. 3D, these suspect tools are identified with a bold outline, while all other tools are shown in dashed lines. The identification of such suspect tools (tools 31A, 32B, and 34C) allows them to be taken off-line in order to be examined and evaluated in hopes of determining one or more causes of poor quality and/or product failure, so that it may be corrected.

By virtue of quickly identifying those tools that are likely to be reliable, and shifting production to those quality tools, the output of the production line may be maintained and the quality of the resulting product improved. At the same time, by further identifying likely suspect tools, technicians and operators may quickly devote time and energy to the tools most likely to be the source of poor quality product. In the hypothetical example of FIGS. 3A-3D, even though the production line employs eighteen individual tools, by carrying out the identification and selection processes of the present invention, only three tools are marked as likely sources of the observed decrease in quality. Advantageously, this analysis is may be validly performed independently of the type of product being manufactured, the type of fabrication being carried out, or the types of individual tools being used.

Also as shown in flowchart 10 of FIG. 1, an alternative embodiment of the present invention may include a method of improving product lot quality including at least a) producing a plurality of product lots using different combinations of tools at 12; b) determining a quality value for the produced product lots at 13; c) establishing a quality benchmark for the product lots at 14; d) identifying those product lots that fail to meet the established quality benchmark at 40; e) identifying the tools used in the production of any of the identified failing products at 42; f) identifying product lots that meet the established quality benchmark at 44; g) identifying those tools used in the production of any identified quality product lots at 46; and h) producing additional product lots by shifting production at least substantially to tools those tools that were not identified as failing tools, and to tools that at least substantially away from those tools identified as failing tools, excepting those that are not also identified as quality tools at 48.

The two disclosed methods are similar, but where the previously discussed method emphasized a shift in production to tools that should immediately enhance product quality, and then optionally identifying those tools most likely to be a source of quality failure, the alternate method emphasizes identifying all potentially suspect tools, and shifting production away from those tools.

Figure 4A:
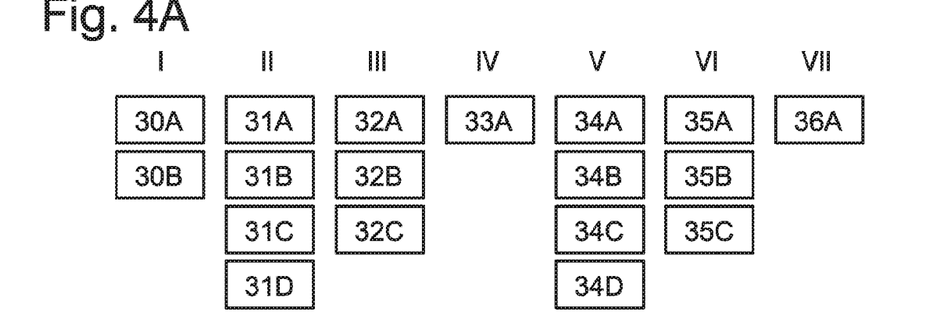
FIG. 4A is a schematic depiction of the individual tools utilized at each of the multiple steps of a production line, according to an exemplary embodiment of the invention.
Figure 4B:
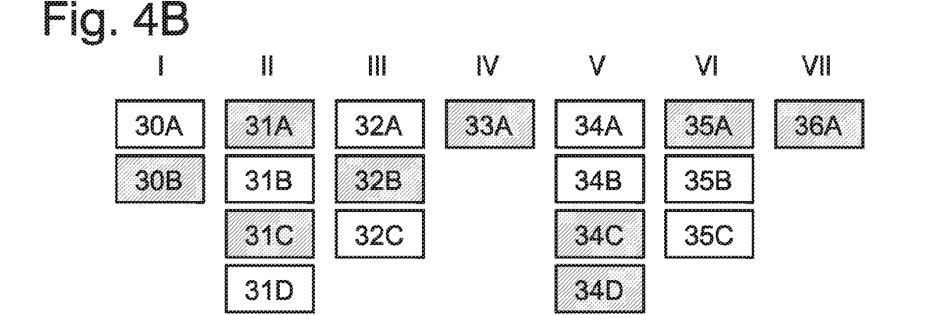
FIG. 4B depicts the identification of tools identified as failing to produce product lots that exceed the established quality benchmark.

These differences may be visualized with reference to FIGS. 4A-4D. FIG. 4A schematically depicts the production line of FIG. 3A, including production steps I-VII, and individual tools 30A-36A. FIG. 4B illustrates an exemplary identification of the tools used to prepare product lots that have failed the established quality benchmark, as set out at 42 of FIG. 1. Tools determined to have been used to prepare a failing product lot (tools 30B, 31A, 31C, 32B, 33A, 34C, 34D, 35A, and 36A) are shown with crosshatching.

Figure 4C:
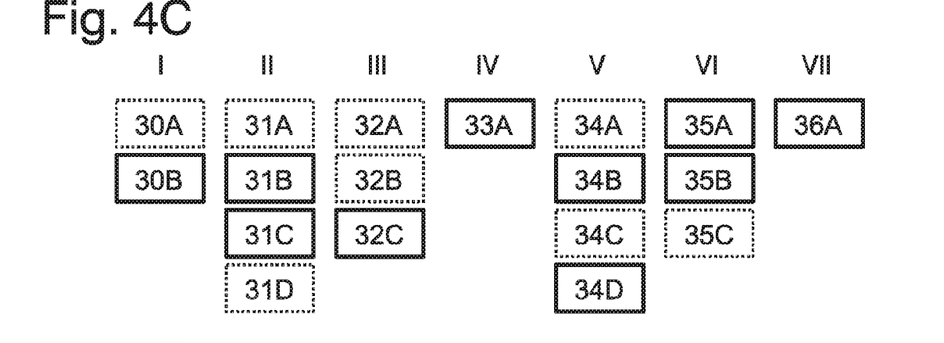
FIG. 4C depicts the identification of the tools identified as producing product lots that exceed the established quality benchmark.

FIG. 4C depicts the identification of the tools used in the production of any product lots identified as passing the established quality benchmark, set out at 46 of FIG. 1. Those tools that produced quality product lots are shown with a bold outline (tools 30B, 31B, 31C, 32C, 33A, 34B, 34D, 35A, 35B, and 36A), the remaining tools are shown in dashed outline. It should be apparent that some overlap exists between the set of identified failing tools and identified quality tools, specifically tools 30B, 31C, 33A, 34D, 35A, and 36A are both identified as failing tools and quality tools.

Figure 4D:
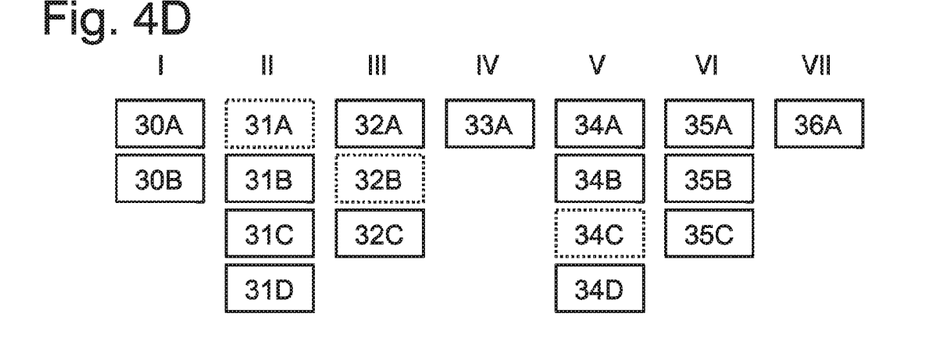
FIG. 4D depicts the identification of tools that are not identified as failing to produce quality product lots, or that are identified as quality tools.

In order to improve overall production quality, production is then shifted so that additional product lots are manufactured at least substantially without using identified failing tools that are not also identified quality tools, as set out at 48 of FIG. 1. With respect to FIG. 4D, this means that production is shifted away from those tools shown in dashed outline (tools 31A, 32B, and 34C).

By quickly identifying those tools that are likely to be least reliable, and shifting production to those tools that are most likely to produce quality product lots, the output of the production line may be maintained and the quality of the resulting product improved. Again, the disclosed method is substantially independent of the type of product, type of fabrication operation, or type of individual tool used in the production line.

It should be readily apparent that the methods disclosed herein are applicable to the manufacture of any of a wide variety of products, employing a variety of disparate production techniques. However, in one embodiment of the present invention the methods disclosed herein may be used in particular to improve the product lot quality for semiconductor chip packages. In particular, the present methods may enhance the quality of fabricated semiconductor chip assemblies where the fabricated semiconductor chip is mounted in a chip package. The chip package may be a single chip package (such as a plastic carrier, with leads that are configured to be affixed to a motherboard or other higher level carrier) or a multichip package (such as a ceramic carrier that has either or both surface interconnections or imbedded interconnections).

The manufacture of semiconductor chip packages is typically a multi-step process, and may include from one to more than ten individual tools at any given production step in the production line, depending upon the individual tool capacities and their speed of operation. The production line may additionally include one or more optical quality inspections. The progression of a given product lot through a production line may be a strictly manual process, or one or more aspects of the production line operation may be automated.

Where the presently disclosed methods are utilized to improve product quality in semiconductor chip package manufacture, the individually production steps for a given production line may include one or more of optical inspections, wafer grinding, wafer polishing, wafer taping, wafer detaping, wafer mounting, wafer dicing, UV erasing, die attachment, epoxy curing, plasma cleaning, wire bonding, molding, module marking, module curing, chip mounting, reflow soldering, flux cleaning, singulation, and dry packing, in any suitable order.

In one embodiment of the invention, the quality of the manufactured semiconductor chip packages is functionally tested. That is, one or more aspects of the chip package are evaluated to determine if each package is functioning properly. When present, it may be particularly advantageous to test the portion of the chip that includes a Phase Locked Loop (PLL), for a variety of reasons that may include accessibility, ease of testing, lack of ambiguity in test results, among others. Additionally, the PLL portion of a chip carrier may be more prone to the kinds of damage caused by electrostatic discharge, or ESD, a significant source of failure in chip package manufacture.

In one aspect of the invention, identified suspect tools (as set out at 26 of FIG. 1, and shown in FIG. 3D) may be taken off-line in order to be analyzed for possible sources of ESD damage to the manufactured chips, while production is shifted at least substantially to identified quality tools, so that production is not interrupted.

As will be appreciated by one skilled in the art, aspects of the present invention may be embodied as a method, a computer system, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF cable, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 5:
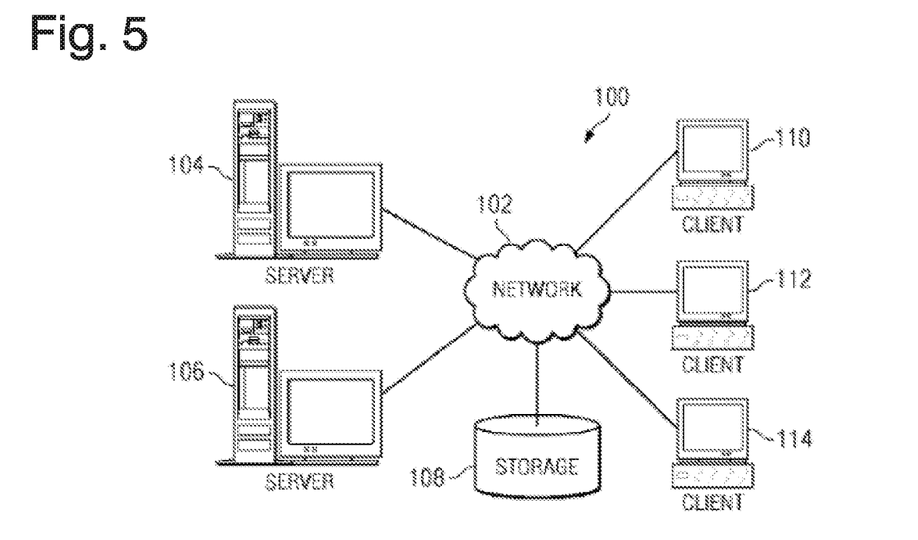
FIG. 5 is a pictorial representation of an example of a computer system in which illustrative embodiments may be implemented.
Figure 6:
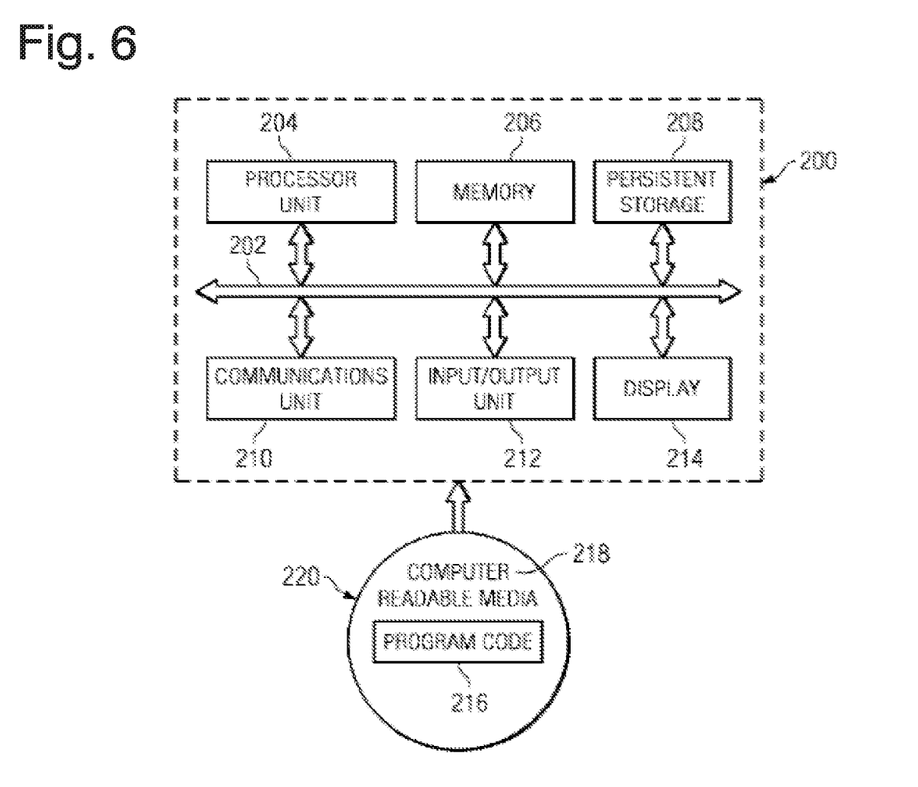
FIG. 6 is a block diagram of an example of a computer in which illustrative embodiments may be implemented.

With reference now to the figures and in particular with reference to FIGS. 5-6, exemplary diagrams of data processing environments are provided in which illustrative embodiments may be implemented. It should be appreciated that FIGS. 5-6 are only exemplary and are not intended to assert or imply any limitation with regard to the environments in which different embodiments may be implemented. Many modifications to the depicted environments may be made.

FIG. 5 depicts a pictorial representation of a computer system, indicated generally at 100, and including a network of computers in which illustrative embodiments may be implemented. Computer system 100 may contain a network 102, which is the medium used to provide communications links between various devices and computers connected together within computer system 100. Network 102 may include connections, such as wire, wireless communication links, or fiber optic cables.

In the depicted example, a server 104 and a server 106 may connect to network 102 along with a storage unit 108. In addition, a first client computer 110, a second client computer 112, and a third client computer 114 may connect to network 102. Client computers 110, 112, and 114 may be, for example, personal computers or network computers. In the depicted example, server 104 may provide data, such as boot files, operating system images, and/or software applications to client computers 110, 112, and 114. Client computers 110, 112, and 114 are clients to server 104 in this example. Computer system 100 may include additional servers, clients, and other devices not shown, or may include fewer devices than those shown.

In the depicted example, network 102 may be or may include the Internet. Computer system 100 also may be implemented with a number of different types of networks, such as for example, an intranet, a local area network (LAN), or a wide area network (WAN). FIG. 5 is intended as an example, and not as an architectural limitation for the different illustrative embodiments. For example, embodiments of the present invention are capable of being implemented in conjunction within a cloud computing environment.

With reference now to FIG. 6, a block diagram of a data processing system is shown in which illustrative embodiments may be implemented. Data processing system 200 is an example of a computer, such as server 104 or client computer 110 in FIG. 2, in which computer-usable program code or instructions implementing the processes may be located for the illustrative embodiments. In this illustrative example, data processing system 200 includes communications fabric 202, which provides communications between a processor unit 204, a memory 206, a persistent storage 208, a communications unit 210, an input/output (I/O) unit 212, and display 214. In other examples, a data processing system may include more or fewer devices.

Processor unit 204 may serve to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. For example, communications unit 210 may be a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 displays information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 may be located in a functional form on a computer-readable media 218 that is selectively removable and may be loaded onto or transferred to data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-recordable storage media. In some instances, computer-recordable media 218 may not be removable.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code. The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 6 can be varied from the illustrative examples shown. As one example, a storage device in data processing system 200 is any hardware apparatus that may store data. Memory 206, persistent storage 208, and computer-readable media 218 are examples of storage devices in tangible forms.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

The methods of the present invention, as described above, may be executed using a production system. According to one embodiment of the present invention, the production system includes a production line for a product that has a plurality of production steps, where at least some of the production steps utilize a plurality of individual tools; a processor, configured to direct each product lot to an individual tool at each production step, and to record each tool utilized to produce each product lot; a memory storage device coupled to the processor; a quality feedback input, configured to transmit a quality value for each completed product lot to the processor; and a program stored in the memory storage device. The stored program itself includes plural instructions that are executable by the processor to: receive data identifying the individual tools used to produce each of a plurality of identified product lots; identify completed product lots that have a passing quality value; identify tools used in the production of identified quality product lots; and direct the routing of subsequent product lots to individual tools at each production step that have been identified as quality tools.

Where a production line utilizes a processor to direct the routing of product lots to individual tools, the directed routing process may simply include the identification of an appropriate tool for a given product lot, so that the product lot may be individually and/or manually delivered to the identified tool. This identification may occur via the generation of an electronic or paper report, or by way of graphical direction provided via one or more displays or monitors, among other methods. Alternatively, or in addition, the directed routing process may include one or more automated steps, such as the delivery of a given product lot to the identified tool by conveyer or other means that can be directly controlled by the processor. For any given production line, product lots may be directed between the individual production steps manually, by automated processes, or by any combination of manual and automated processes.

In one embodiment of the invention, the production system is directed to the manufacture of semiconductor chip packages. In this embodiment the plurality of production steps in the production line may include one or more of optical inspection, wafer grinding, wafer polishing, wafer taping, wafer detaping, wafer mounting, wafer dicing, UV erasing, die attachment, epoxy curing, plasma cleaning, wire bonding, molding, module marking, module curing, chip mounting, reflow soldering, flux cleaning, singulation, and dry packing.

In an alternative embodiment of the present invention, the invention may include a computer program product for improving lot quality for product lots produced on a production line having a plurality of production steps, where at least some of the production steps utilize a plurality of individual tools, the computer program product including a plurality of computer-executable instructions stored on a computer-readable medium, where the instructions are executable by a server to: receive data identifying the individual tools used to produce each of a plurality of identified product lots; receive data identifying the quality value of each identified product lot; compare the quality of each identified product lot to a threshold quality value; identify all tools that were used to produce identified product lots exceeding the threshold quality value; and direct the production of additional product lots to those tools identified as producing product lots exceeding the threshold quality value.

In yet another embodiment of the invention, the computer program product of the present invention may further include instructions executable by the server to: identify all tools that were used to produce product lots failing to meet the threshold quality value; and exclude from the identified failing tools any tools also identified as producing product lots exceeding the threshold quality value; identify the remaining failing tools as potential sources of poor product lot quality; and direct the production of additional product lots to those tools identified as producing product lots exceeding the threshold quality value.

The computer program product of the present invention may further include instructions executable by the server to: identify all tools that were used to produce product lots failing to meet the threshold quality value; exclude from the identified failing tools any tools also identified as producing product lots exceeding the threshold quality value; and identify the remaining failing tools as potential sources of poor product lot quality.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the various embodiments of the present invention has been presented for purposes of illustration, but is not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of improving lot quality for semiconductor chip package product lots produced on a production line having a plurality of production steps, wherein at least some of the production steps utilize a plurality of individual tools, and wherein the method comprises:
producing a plurality of semiconductor chip package product lots using different combinations of the tools;
determining quality values for the produced product lots;
establishing a quality benchmark for the product lots, including establishing a maximum acceptable failure rate for the product lots;
identifying product lots that meet the quality benchmark, including identifying product lots having a failure rate greater than the maximum acceptable failure rate;
identifying a set of quality tools used in the production of identified quality product lots;
identifying a set of failing tools used in the production of identified failing product lots to create a listing of suspect tools, and evaluating listed suspect tools for causes of semiconductor chip package failure; and
producing additional product lots by shifting production at least substantially to the identified set of quality tools.

2. The method of claim 1, wherein producing additional product lots further comprises producing product lots having improved quality.

3. The method of claim 1, further comprising:
identifying product lots that fail to meet the quality benchmark;
identifying tools used in the production of identified failing product lots;
identifying failing tools that are not also identified quality tools to create a listing of suspect tools; and
evaluating the listed suspect tools in order to determine a cause of failure contributed by the use of the suspect tools.

4. The method of claim 1, wherein producing additional product lots includes producing additional product lots without interrupting the production line.

5. The method of claim 4, wherein producing additional product lots without interrupting the production line includes producing additional product lots while maintaining a desired overall throughput for the production line.

6. The method of claim 1, wherein the production line relates to manufacture of semiconductor chip packages.

7. The method of claim 1,
wherein a failure rate for a product lot is determined using functional testing.

8. The method of claim 1, wherein evaluating the listed suspect tools includes identifying a tool-related cause of semiconductor chip package failure.

9. The method of claim 1, wherein evaluating the listed suspect tools includes determining that at least some semiconductor chip package failures were due to electrostatic discharge-related damage caused by one or more of the suspect tools.

10. The method of claim 1, wherein producing the plurality of semiconductor chip package lots includes performing one or more production steps selected from optical inspection, wafer grinding, wafer polishing, wafer taping, wafer detaping, wafer mounting, wafer dicing, UV erasing, die attachment, epoxy curing, plasma cleaning, wire bonding, molding, module marking, module curing, chip mounting, reflow soldering, flux cleaning, singulation, and dry packing.

11. The method of claim 1, wherein establishing the maximum acceptable failure rate includes establishing a maximum acceptable failure rate of about 2%.

12. The method of claim 1, wherein determining actual failure rates includes functionally testing a phase locked loop of a plurality of semiconductor chip packages from produced semiconductor chip package lots.

13. The method of claim 1, wherein establishing a quality benchmark includes establishing a quality benchmark having a value within a range of values of the determined quality values.

14. The method of claim 1, wherein the set of quality tools comprises at least one tool used in the production of at least one identified quality product lot, and wherein the set of failing tools comprises at least one tool used in the production of at least one identified failed product lot.

15. A method of improving lot quality for semiconductor chip package product lots produced on a production line having a plurality of production steps, where at least some of the production steps utilize a plurality of individual tools, comprising:
producing a plurality of semiconductor chip package product lots using different combinations of the tools;
determining quality values for the produced product lots;
establishing a quality benchmark for the product lots, including establishing a maximum acceptable failure rate for the product lots;
identifying product lots that fail to meet the quality benchmark, including identifying product lots having a failure rate greater than the maximum acceptable failure rate;
identifying a set of failing tools used in the production of identified failing product lots to create a listing of suspect tools;
evaluating listed suspect tools for causes of semiconductor chip package failure;
identifying product lots that meet the quality benchmark;
identifying a set of quality tools used in the production of any identified quality product lots; and
producing additional product lots by shifting at least a substantial production to the tools that are not comprised in an intersection of the identified set of quality tools and the identified set of failing tools.

16. The method of claim 15, wherein producing additional product lots further comprises producing product lots having improved quality.

17. The method of claim 15, wherein producing additional product lots includes producing additional product lots without interrupting the production line.

18. The method of claim 15, further comprising identifying product lots that meet the quality benchmark, wherein the listing of suspect tools is created from tools that are not in the set of quality tools, and wherein evaluating the listing of suspect tools for causes of semiconductor chip package failure comprises determining a cause of failures contributed by the use of the suspect tools.

19. A production system comprising:
a production line for semiconductor chip package product lots, the production line having a plurality of production steps, and at least some of the production steps utilizing a plurality of individual tools;

a processor, configured to direct each product lot to an individual tool at each production step, and to record each tool utilized to produce each product lot;

a memory storage device coupled to the processor;

a quality feedback input, configured to transmit a quality value for each completed product lot to the processor, wherein a quality benchmark for the product lots is established, and wherein the establishment of the quality benchmark includes establishing a maximum acceptable failure rate for the product lots;

a program including plural instructions stored in the memory storage device and executable by the processor to:

receive data identifying the individual tools used to produce each of a plurality of identified product lots;

identify completed product lots that have a passing quality value, including instructions to identify product lots having a failure rate greater than the maximum acceptable failure rate;

identify a set of quality tools used in the production of identified quality product lots;

identify a set of failing tools used in the production of identified failing product lots to create a listing of suspect tools, and evaluate listed suspect tools for causes of semiconductor chip package failure; and direct a routing of subsequent product lots to individual tools at each production step that have been identified as quality tools of the identified set of quality tools.

20. The production system of claim 19, wherein the plurality of production steps includes one or more of optical inspection, wafer grinding, wafer polishing, wafer taping, wafer detaping, wafer mounting, wafer dicing, UV erasing, die attachment, epoxy curing, plasma cleaning, wire bonding, molding, module marking, module curing, chip mounting, reflow soldering, flux cleaning, singulation, and dry packing.

21. A computer program product for improving lot quality for semiconductor chip package product lots produced on a production line having a plurality of production steps, where at least some of the production steps utilize a plurality of individual tools, the computer program product including a plurality of computer-executable instructions stored on a computer-readable storage device, and comprising instructions executable by a server to:

receive data identifying the individual tools used to produce each of a plurality of identified semiconductor chip package product lots;

receive data identifying the quality value of each identified product lot;

compare the quality value of each identified product lot to a threshold quality value, wherein the threshold quality value comprises a maximum acceptable failure rate;

identify all tools that were used to produce identified product lots having respective quality values exceeding the threshold quality value, and identify all tools that were used to produce identified product lots having quality values below the threshold quality value, wherein the tools that were used to produce identified product lots exceeding the threshold value are failing tools of a set of failing tools used in the production of identified failing product lots to create a listing of suspect tools, and wherein the tools that were used to produce identified product lots below the threshold value are quality tools of a set of quality tools used in the production of identified quality product lots;

evaluate listed suspect tools for causes of semiconductor chip package failure; and direct the production of additional product lots, including shifting production at least substantially to the set of quality tools.

22. The computer program product of claim 21, where the plurality of computer-executable instructions further comprises instructions executable by the server to:

exclude from the identified set of failing tools any tools that are simultaneously in the set of quality tools; and identify remaining failing tools as potential sources of poor product lot quality.

\* \* \* \* \*